F. S. CLARKSON.
CUTTER-HEADS FOR GROOVING AND CHANNELING.
No. 194,221. Patented Aug. 14, 1877.
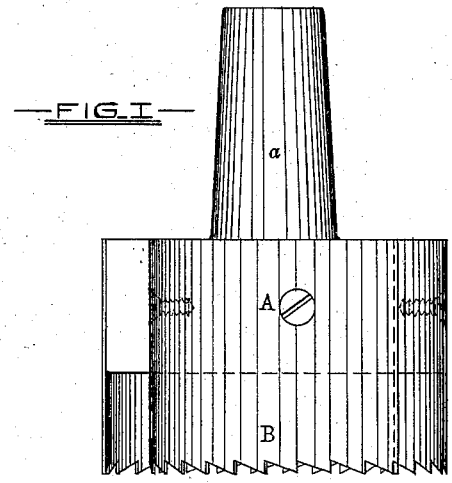
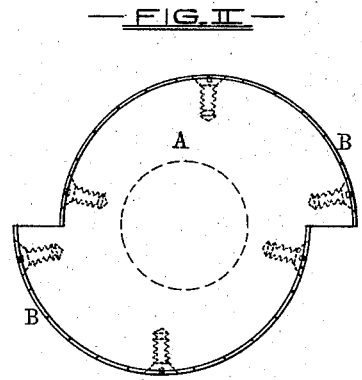
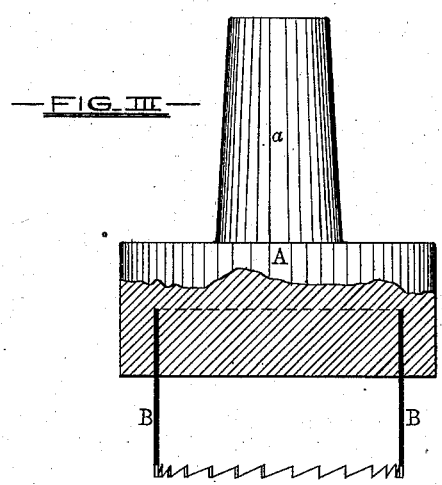
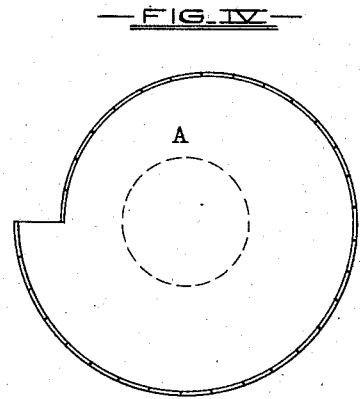

UNITED STATES PATENT OFFICE.

FRANK S. CLARKSON, OF BALTIMORE COUNTY, ASSIGNOR TO RICHARD CROMWELL AND FRANK B. SLOAN, (COMPOSING THE FIRM OF C. SIDNEY NORRIS & CO.,) OF BALTIMORE CITY, MARYLAND.

IMPROVEMENT IN CUTTER-HEADS FOR GROOVING AND CHANNELING.

Specification forming part of Letters Patent No. 194,221, dated August 14, 1877; application filed July 12, 1877.

*To all whom it may concern:*

Be it known that I, FRANK S. CLARKSON, of the county of Baltimore and State of Maryland, have invented certain Improvements in Surface Grooving and Channeling Bits, of which the following is a specification; and I do hereby declare that in the same is contained a full, clear, and exact description of my said invention, reference being had to the accompanying drawings, and to the letters of reference marked thereon.

This invention relates to a surface channeling or grooving bit, consisting of a revoluble head, to which are secured a series of volute saws—that is to say, saws bent in the form of scrolls or volutes, with their toothed edges projecting from the face of the revoluble head, as will hereinafter more fully appear.

In the description of the invention which follows, reference is made to the accompanying drawings, forming a part hereof, and in which—

Figures 1 and 2 are, respectively, a side and a face view of the improved bit. Figs. 3 and 4 illustrate modifications in the construction of the invention.

Similar letters of reference indicate similar parts of the invention in all the figures.

A is the revoluble head, provided with an extension thereof, *a*, for securing it to a lathe, spindle, or other rotating device to which power is applied. B B are saws bent in the form of volutes and attached to the revoluble head A in any suitable manner.

In Figs. 1 and 2 the saws are shown as fastened to the outside of the head, and in Fig. 3 by being inserted in grooves in the face of the same. In Fig. 4 one saw only is used, the said saw forming a complete convolution.

In all the different arrangements of the volute saws it will be seen that the width of the annular groove cut by the bit is governed by the eccentricity of the saws, and that the outer and inner diameters of the groove correspond with the circles described, respectively, by the outer and inner ends of the saws.

Further, it will be seen that all the teeth in a saw operate independently—that is to say, each tooth cuts in a different circumferential line—thereby enabling the bit to cut very rapidly without clogging or being impeded in its movement by an accumulation of sawdust or shavings.

Having thus described my invention, what I claim as new, and wish to secure by Letters Patent of the United States, is—

A surface grooving and channeling bit, consisting of the volute head A, having an extension, *a*, provided with one or more saws, B, the teeth of which project from the face of said head in the direction of the line forming the center around which the head, when in operation, is revolved, substantially as herein shown and described.

In testimony whereof I have hereunto subscribed my name this 7th day of June, A. D. 1877.

FRANK S. CLARKSON.

Witnesses:
J. W. HOLCOMB,
EMIL A. DAPPER.